April 1, 1947.  D. F. SMITH  2,418,372
PURIFICATION OF CAUSTIC SODA AND PRODUCTION OF CAUSTIC COMPOUND
Filed May 16, 1942
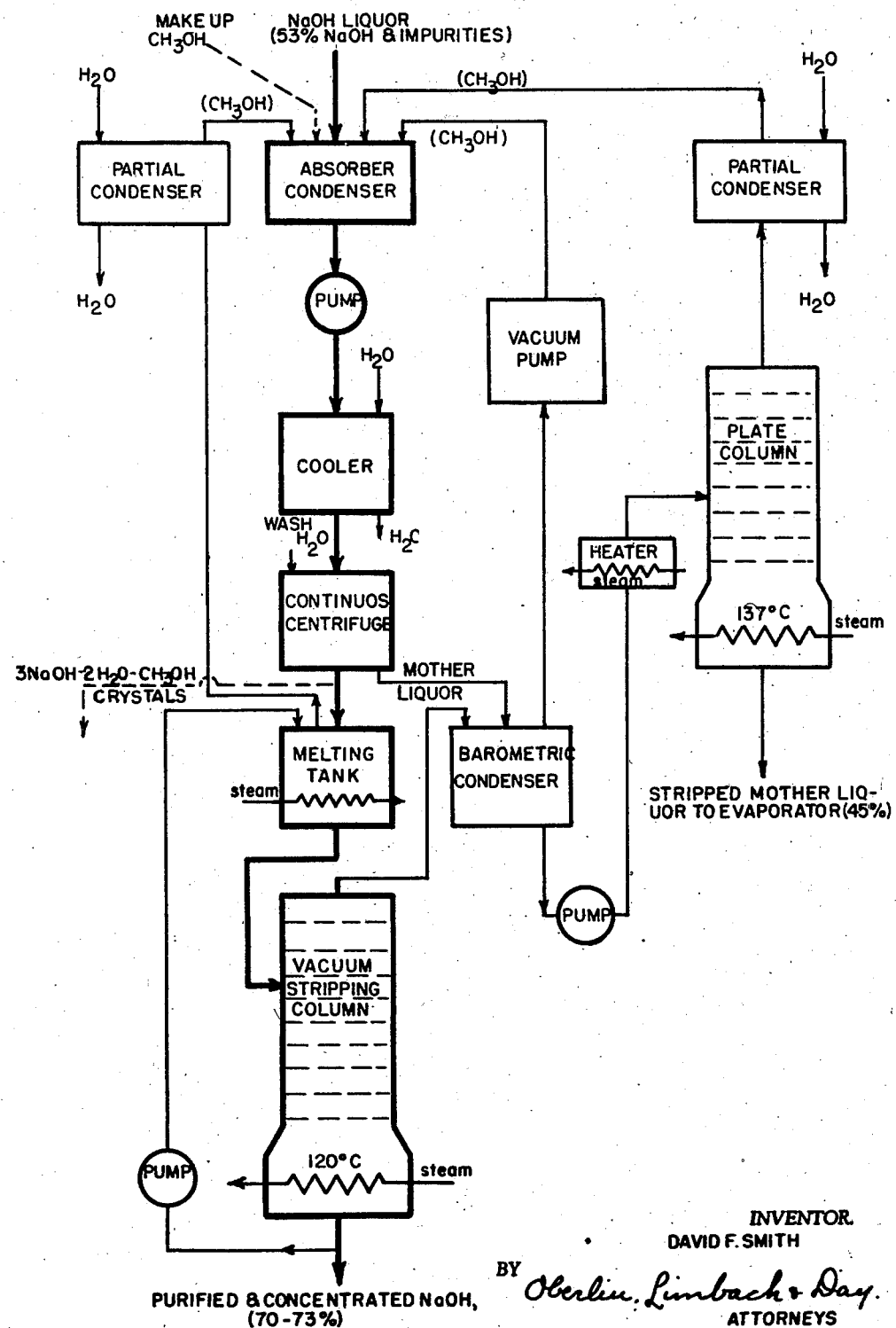
INVENTOR.
DAVID F. SMITH
BY *Oberlin, Limbach & Day.*
ATTORNEYS Patented Apr. 1, 1947

2,418,372

UNITED STATES PATENT OFFICE 2,418,372

PURIFICATION OF CAUSTIC SODA AND PRODUCTION OF CAUSTIC COMPOUND

David F. Smith, Grosse Ile, Mich., assignor, by mesne assignments, to Wyandotte Chemicals Corporation, Wyandotte, Mich., a corporation of Michigan Application May 16, 1942, Serial No. 443,238

13 Claims. (Cl. 23—184)

The present invention relates to a process for purifying caustic soda, i. e., sodium hydroxide, and as an interdependent feature of such process, the production of a new chemical composition in the form of a new caustic alkali compound. The caustic soda purifying process of my invention simultaneously involves the concentration of the sodium hydroxide content of a caustic soda solution, or alternatively, the reduction of the water content of such solution.

It is therefore the general object and nature of my invention to provide a process, involving the production of a new caustic alkali compound, for separating the chemical compound NaOH from other chemical compounds and elements, including water, for the purpose of increasing the chemical purity of the caustic soda product.

The purification of caustic soda has constituted a major problem confronting the alkali industry for many years. In the commercial manufacture of caustic soda, several other chemical elements and compounds become necessarily included in the product. Their presence is undesired and, hence, they have generally been termed "impurities." Such additional chemical compounds and elements, constituting such impurities, are, for example, sodium chloride, sodium chlorate (particularly prominent in caustic soda made by the diaphragm electrolytic cell process), sodium carbonate, iron, manganese and silica. Since large quantities of caustic soda are sold, transported and used in their more highly concentrated form, viz., of 70% by weight of NaOH content or greater, the reduction of the water content of caustic soda solutions, during the process of manufacture, has also been a desired objective of the industry, and hence, in the broad consideration of my present invention, water is also to be regarded as an "impurity," falling within the general objective of increasing the relative percentage content of the chemical compound NaOH to the exclusion of other chemical compounds and elements initially entrained in it.

Heretofore, the problem of purifying caustic soda has been practiced and attempted in several different ways. Thus, the selective crystallization of caustic liquor solutions to separate out either the NaOH or a hydrate thereof, or impurities, has been disclosed. See U. S. Patents Nos. 971,144, 1,733,879 and 1,865,281. The treatment of caustic with various inorganic chemical reagents for the purpose of removing impurities has also been known and practiced, involving the use of such reagents as aqueous ammonia (U. S. Patent No. 1,961,590); magnesium compounds (U. S. Patent No. 1,997,691); and sodium sulphate (U. S. Patent No. 1,888,886). All of these prior processes, however, have involved certain difficulties and shortcomings, either from the standpoint of efficiency of removal of impurities, cost of operation, of materials and reagents required, or relatively expensive and complicated equipment.

I have made the discovery that the treatment of caustic soda with an alcohol, e. g., methyl, ethyl, propyl, butyl, amyl, and benzyl alcohols results in the formation of a solid compound whose constituents are the alcohol and sodium hydroxide, and that the latter may be precipitated, the impurities remaining behind, and relatively pure sodium hydroxide then recovered by simple decomposition of the alcohol-sodium hydroxide compound. The alcohol recovered from this latter decomposition is then available for re-circulation and re-use in the treatment of additional caustic soda for purification.

So far as I am aware, I am the first to discover that an organic hydroxy compound is capable of combining with aqueous sodium hydroxide and forming a combined compound therewith which can be easily isolated as a solid and from which sodium hydroxide can be recovered by simple decomposition. A solid compound derived by crystallization from a mixture of absolute alcohol and anhydrous caustic soda has previously been reported in the literature. However, the formation of solid compounds from water solutions of NaOH with alcohols to produce a molecular combination of the sodium hydroxide and the alcohol is novel. In particular, the treatment of caustic soda solutions of approximately 50% by weight NaOH content with an alcohol selected from the group of methyl, ethyl, propyl, amyl, butyl and benzyl alcohols, such alcohols being added in an amount considerably less than the weight of the sodium hydroxide present, e. g., in not over an aliquot fraction thereof, results in the precipitation from the liquid mixture of new solid compounds whose composition is made up of combined molecules of sodium hydroxide and of the alcohol.

When methyl alcohol is employed as the alcohol for treating caustic soda, a new and useful caustic alcohol compound is produced. This new compound, whose composition is indicated by the chemical formula $3NaOH.2H_2O.CH_3OH$, is a white crystalline compound, which does not exhibit hygroscopic tendencies as great as those of solid caustic soda itself, but still possesses a high degree of alkalinity, and hence is indicated as a valuable and desirable detergent material.

Additional objects and advantages shall become apparent as the following description proceeds.

To the accomplishment of the foregoing and related ends, this invention, then, consists of the features hereinafter fully described and particularly pointed out in the claims.

The annexed drawing and following description set forth in detail a few of the various ways in which the principle of the invention may be employed.

The annexed drawing is a flow sheet illustrating the process embodying the principle of my invention.

Now referring more particularly to the drawing, it will be seen that the heavier arrows illustrate the main flow, or principal operative steps of the caustic soda purifying process. Thus, caustic soda liquor on the order of 50% NaOH content by weight, viz. 53% NaOH concentration, as noted in the flow sheet, is introduced to the absorber condenser along with methyl alcohol or methanol ($CH_3OH$). The temperature in the absorber condenser is preferably in the range of 60–70° C. This prevents any high local concentration of methanol which might result in precipitation of salt along with the crystals of the resultant compound. The solution from the absorber condenser is then pumped to the cooler where the crystalline compound of sodium hydroxide, methanol and water, is formed and precipitated out from the mother liquor, the impurities such as NaCl and $NaClO_3$ remaining in solution in the mother liquor. The action of the cooler removes the heat of crystallization, thus increasing the yield of crystals of the precipitated compound.

The crystals of the precipitated compound are then separated from the mother liquor in a continuous centrifuge. As indicated by the dotted line in the flow sheet, these crystals having the chemical formula $3NaOH.2H_2O.CH_3OH$, may be removed as a product of the process in and of itself. This new compound is quite stable at atmospheric temperatures and composed of white crystals having a boiling point of approximately 128° C. and a melting point of about 119° C. It is not as hygroscopic as caustic soda and possesses considerable alkaline properties.

As the crystals are separated from the mother liquor in the continuous centrifuge they may be finally washed with a little water, pure caustic soda solution, methanol or pure sodium hydroxide-water-methanol solution of composition corresponding to that of the mother liquor, depending on the degree of purity required in the purified caustic. If especially pure crystals of the new compound are desired, they may also be washed with a solvent such as ether.

The crystals are then introduced to the melting tank where they are mixed with sufficient hot purified caustic liquor of 70 to 73% NaOH content, in order to make a slurry which is pumped into the vacuum stripping column. This column contains a few distillation-column plates and a tubular nickel callandria heated by steam. It is in the vacuum stripping column wherein the sodium hydroxide-water-methanol compound is decomposed to form relatively pure sodium hydroxide and methanol. When the crystals with a normal amount of mother liquor are stripped of methanol alone without removing any water, about 72% by weight NaOH remains. Water tends to come out to some extent with the methanol, and if desired, a partial condenser may be added in conjunction with the stripping column for returning such water thereto. The concentration of the resultant purified caustic liquor, depending on the amount of water initially present, the amount removed with the methanol and the amount returned, is in the range of 70–73% NaOH content. As noted, the stripping column is operated under a vacuum, induced by the barometric condenser, and the steam introduced at a temperature of 120° C., thus reducing the operating temperature of the column.

In the initial treatment of the caustic liquor, with methanol, not over 10% by weight of methanol on the basis of the caustic soda solution is required. The methanol is recovered in the corollary operations of the process, and, as shown on the flow sheet, for re-use in treatment of additional caustic liquor for purification. Thus the mother liquor from the centrifuge will contain about 2 to 4% by weight of methanol, and the centrifuged crystals up to 17% by weight of methanol, depending on the completeness of removal of mother liquor from them.

The methanol is recovered from the mother liquor by passing it through the barometric condenser, pumping it through a heater and into the plate column which is operated at atmospheric pressure, and heated to 130° C. The methanol vapor emitted at the top of the plate column is then introduced to the absorber condenser at the beginning of the main process. The mother liquor from the bottom of the plate column, containing the impurities, may then be evaporated to a concentration of about 50–53% NaOH content, cooled and NaCl crystallized therefrom, reducing the content of the latter in the mother liquor to about 1%, thus rendering such mother liquor ready to be itself introduced to the main process for purification and concentration, such as by mixing with additional untreated caustic liquor in an amount corresponding to the amount of sodium hydroxide removed in the form of the sodium hydroxide-water-methanol compound.

The methanol from the crystals is recovered both from the melting tank and from the vacuum stripping column. Thus the methanol vapor from the melting tank is simply passed through the partial condenser which operates to reflux the water from the methanol vapor and the latter is re-introduced to the absorber condenser at the beginning of the process. The methanol and water vapor from the top of the vacuum stripping column are similarly treated in the barometric condenser, and the methanol vapor then returned by the vacuum pump to the absorber condenser. Sufficient make-up methanol may be added to the absorber condenser from time to time to compensate for any minor losses which occur during the re-circulation and re-use of the methanol in the process.

It is to be noted that in the above process, as the pure crystals of $3NaOH.2H_2O.CH_3OH$ precipitate from the caustic liquor, the impurity in the form of NaCl remains dissolved in the mother liquor as long as saturation is not exceeded at the final crystallization temperature used. Since the ratio of NaOH to $H_2O$ is higher in the precipitated crystals than in the original mother liquor, as the crystals form, the mother liquor will become more dilute in NaOH and hence, the NaCl solubility in the mother liquor will increase, and finally the NaOH concentration in the mother liquor will decrease to the point where further additions of methanol will not produce appreciably more crystals. Thus a point of diminishing returns is reached where the addition of methanol merely adds to the amount to be later recovered from the mother liquor.

A limitation of amount of methanol going into the mother liquor to not over 10% by weight is accordingly to be desired under ordinary conditions of operation.

The following example of laboratory test data conducted upon the operation of my above-described process, will further serve to illustrate the principle of the invention, and will enable those skilled in the art more conveniently to comprehend same: Impure caustic liquor in the amount of 2959 grams containing 52.9% by weight NaOH, 1.024% NaCl and .0792% NaClO₃ was heated to 70° C. and 241.7 grams of 98% methanol added in a closed container. The temperature of this mixture under influence of the heat of dilution, rose to 77° C., at which point a homogeneous solution was obtained. In order to obtain equilibrium conditions, this solution was then cooled with stirring to 35° C. over a period of six and one-half hours. Crystals of the new compound consisting of sodium hydroxide, methanol and water started to appear at a temperature of 76° C. The mixture of cooled crystals and mother liquor was centrifuged for about 5 minutes at 2500 R. P. M. in a centrifuge with an 8 in. diameter basket fitted with a nickel gauze screen. The weight of crystals obtained was 854 grams of the following analysis:

|  | Per cent |
|---|---|
| NaOH | 62.3 |
| CH₃OH | 15 |
| NaCl | .089 |
| NaClO₃ | .0053 |

The crystals, after heating and decomposition to remove methanol, produced a solution of sodium hydroxide in which the content of the latter was 73% by weight.

The analysis of the mother liquor, in the amount of 2250 grams, was as follows:

|  | Per cent |
|---|---|
| NaOH | 44.05 |
| CH₃OH | 3 |
| NaCl | 1.272 |
| NaClO₃ | .102 |

(97 grams of crystals, mother liquor and methanol were lost in handling.)

From the data of the foregoing example, consisting essentially of laboratory experiments, and not intended in any way to limit the scope of my invention, but merely for purposes of illustrating the mode of operation and beneficial results thereof, it will be seen that the NaOH content of the caustic soda solution was increased from 52.9 to 73% by weight, representing a 37.8% increase on the basis of the original amount; the NaCl decreased from 1.024 to .089%, representing a 92% decrease upon the basis of original content; and the NaClO₃ reduced from .0792 to .0053%, representing a 93.5% decrease on the basis of original content.

Thus it will be seen that in addition to the above pointed out advantages of substantially reducing the impurities found in caustic soda, together with the production of a new caustic alkali compound, that the process of my invention also possesses the highly desired economic advantage of reducing the water content of the caustic soda solution, or alternatively stated, increasing the NaOH concentration. This represents an additional beneficial result and productive asset of the invention.

The possible build up of the chlorate and iron content in the mother liquor, where the latter is evaporated and re-cycled to the process, can, of course, be eliminated by removal treatments therefor well known to those skilled in the art. However, such corollary removal treatments do not constitute any part of the essential characteristic of novelty of my invention as hereinabove described and as hereinafter particularly pointed out and defined in the claims.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:

1. The method of increasing the sodium hydroxide content of an aqueous caustic soda solution containing sodium hydroxide, water and other chemical compounds, consisting in adding an alcohol to said solution, the amount of the alcohol employed being considerably less than the weight of NaOH, but sufficient to form a constituent of the combined molecules of NaOH and the alcohol, effecting an increase in temperature, then cooling the solution without removing the water thereby forming a precipitate containing sodium hydroxide and alcohol, separating said precipitate from the remaining solution, and then recovering sodium hydroxide from said precipitate and the alcohol separately.

2. The method of increasing the sodium hydroxide content of caustic soda solutions containing sodium hydroxide, water and other chemical compounds, consisting in adding an alcohol to said solutions, the amount of the alcohol being considerably less than the weight of NaOH, but sufficient to form a constituent of the combined molecules of NaOH and the alcohol forming a solid compound comprising sodium hydroxide and said alcohol as ingredients thereof without removing the water, separating said solid compound from the remaining solution, decomposing said solid compound to recover sodium hydroxide and alcohol and then returning such alcohol to the process for treatment of additional caustic soda solution.

3. The method of increasing the sodium hydroxide content of caustic soda solutions containing sodium hydroxide, water and other chemical compounds, consisting in adding an alcohol to said solutions selected from the group consisting of methyl, ethyl, propyl, butyl, amyl and benzyl alcohols, the amount of the alcohol being considerably less than the weight of NaOH, but sufficient to form a constituent of the combined molecules of NaOH and the alcohol, forming a precipitate containing sodium hydroxide and the alcohol without removing the water, separating said precipitate from the remaining solution, and then recovering sodium hydroxide from said precipitate and the alcohol as a by-product.

4. The method of increasing the sodium hydroxide content of caustic soda solutions containing sodium hydroxide, water and other chemical compounds, consisting in adding an alcohol to said solutions selected from the group consisting of methyl, ethyl, propyl, butyl, amyl and benzyl alcohols, the amount of the alcohol being considerably less than the weight of NaOH, but sufficient to form a constituent of the combined molecules of NaOH and the alcohol, forming a solid compound comprising sodium hydroxide and said alcohol as ingredients thereof without removing the water, separating said solid compound from the remaining solution, decomposing said solid compound to recover sodium hydroxide and alcohol and then returning such alcohol to the process for treatment of additional caustic soda solution.

5. The method of purifying caustic soda solutions, consisting in adding an alcohol to the aqueous solution of caustic soda containing sodium chloride and other impurities, the amount of the alcohol being considerably less than the weight of NaOH, but sufficient to form a constituent of the combined molecules of NaOH and the alchol, precipitating a compound comprising sodium hydroxide and said alcohol without removing the water, separating said precipitated compound from the mother liquor of the solution, removing the alcohol from said compound, removing the alcohol contained in said mother liquor, returning both portions of such removed alcohol to the process for treatment of additional caustic soda solution, evaporating the mother liquor from which the alcohol has been removed, cooling said mother liquor and removing the excess sodium chloride therefrom, and then mixing the resultant mother liquor with additional caustic soda solution for recycling through the aforesaid purifying process.

6. The method of purifying caustic soda consisting in treating aqueous caustic soda containing impurities with methanol, the amount of methanol being considerably less than the weight of the NaOH present, but sufficient to form a ternary compound, thereby forming a solid compound in which sodium hydroxide, water and methanol are constituents, separating the solid compound from the mother liquor and then recovering purified caustic soda from said compound.

7. The method of increasing the sodium hydroxide content of a caustic soda solution containing sodium hydroxide, water and other chemical compounds, consisting in mixing methanol with said solution, the amount of methanol being considerably less than the weight of the NaOH present, but sufficient to form a ternary compound cooling the solution without removing the water, thereby forming a precipitate comprising a compound in which sodium hydroxide, water and methanol are the constituents thereof, separating said precipitate from the remaining solution, and then recovering sodium hydroxide from said precipitate.

8. The method of increasing the sodium hydroxide content of a caustic soda solution containing sodium hydroxide, water and other chemical compounds, consisting in adding methanol to said solution, the amount of methanol being considerably less than the weight of NaOH, but sufficient to form a ternary compound, cooling the solution without removing the water thereby forming a precipitate comprising a compound in which sodium hydroxide, water and methanol are the constituents thereof, separating said precipitate from the remaining solution, decomposing said compound to recover sodium hydroxide and alcohol, then returning said alcohol to the process for treatment of additional caustic soda solution.

9. The process for purifying caustic soda solution consisting in the steps of mixing methanol with an aqueous solution of caustic soda containing impurities the amount of methanol being considerably less than the weight of NaOH, but sufficient to form a ternary compound, precipitating therefrom a compound in which sodium hydroxide, water and methanol are the constituents thereof, separating said compound from the mother liquor of the solution, separating methanol from said compound and from said mother liquor, returning both of the latter portions of said methanol to the process for treatment of additional caustic soda solution, evaporating said mother liquor, cooling said mother liquor and removing excess sodium chloride therefrom, and then mixing the resultant mother liquor with additional caustic soda solution for re-cycling in the aforesaid purifying process.

10. The method of concentrating caustic soda solutions from approximately 50% by weight to 70–73% NaOH content consisting in mixing methanol with an aqueous caustic soda solution of about 50% NaOH content in an amount considerably less than the weight of NaOH, but sufficient to form a ternary compound, forming a precipitate consisting of sodium hydroxide, methanol and water, separating the precipitate from the mother liquor and then decomposing said precipitate with heat to produce a caustic soda solution of 70–73% NaOH content.

11. The method of concentrating caustic soda solutions from approximately 50% by weight to 70–73% NaOH content consisting in adding methanol in the amount of not over 10% by weight on the basis of caustic soda solution, but sufficient to form a ternary compound, to a causic soda solution of about 50% NaOH content, forming a precipitate consisting of sodium hydroxide, methanol and water, separating the precipitate from the mother liquor and then decomposing said precipitate with heat to produce a caustic soda solution of 70–73% NaOH content.

12. The method of purifying caustic soda, consisting in treating aqueous caustic containing impurities with an alcohol and without removing the water, the amount of the alcohol employed being considerably less than the weight of NaOH, but sufficient to form a constituent of the combined molecules of NaOH and the alcohol, forming a solid compound containing sodium hydroxide and the alcohol, separating the said solid compound from the mother liquor and then recovering relatively pure caustic from the said compound and the alcohol as a by-product.

13. The method of purifying caustic soda, consisting in treating aqueous caustic soda containing impurities with an alcohol selected from the group consisting of methyl, ethyl, propyl, butyl, amyl and benzyl alcohols, and without removing the water, the amount of the alcohol employed being considerably less than the weight of NaOH, but sufficient to form a constituent of the combined molecules of NaOH and the alcohol, forming a solid compound containing NaOH and the alcohol, separating the said solid compound from the mother liquor and then recovering relatively pure caustic from the said compound and the alcohol as a by-product.

DAVID F. SMITH.

REFERENCES CITED

The following references are of record in the file of this patent:

UNITED STATES PATENTS

| Number | Name | Date |
|---|---|---|
| 2,127,496 | Waldeck | Aug. 23, 1938 |
| 1,712,830 | Kyrides | May 14, 1929 |

FOREIGN PATENTS

| Number | Country | Date |
|---|---|---|
| 255,880 | British | July 21, 1926 |

OTHER REFERENCES

Holleman et al., "Text-Book of Organic Chemistry," page 66, first edition (1903). John Wiley & Sons, New York. (Copy in Scientific Library.)